Aug. 14, 1951 H. GREENSPOON ET AL 2,564,431
CLEARING MEANS FOR NOZZLES
Filed Sept. 24, 1947
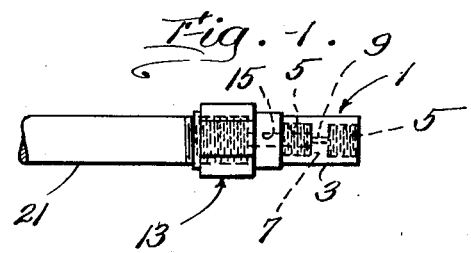
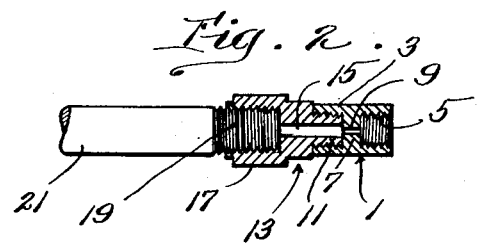
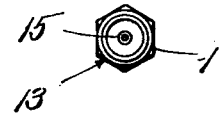
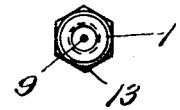
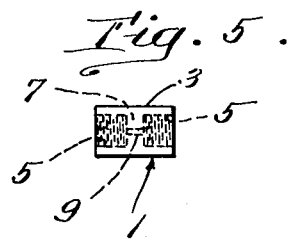
INVENTORS:
HYMAN GREENSPOON
NORMAN KRISTAL
BY Robert K. Randall
ATTORNEY Patented Aug. 14, 1951

2,564,431

UNITED STATES PATENT OFFICE 2,564,431

CLEARING MEANS FOR NOZZLES

Hyman Greenspoon, Mattapan, and Norman Kristal, Dorchester, Mass.

Application September 24, 1947, Serial No. 775,828

1 Claim. (Cl. 299—107)

This invention relates in general to nozzles for discharging liquids from conduits, and in particular to nozzles having relatively small delivery passages or apertures for discharging liquids in an essentially thin and fine stream, jet, or spray. A typical example of the use of such nozzles is in the spraying of the springs of an automobile with a very fine jet of an oil designed to penetrate between the leaves of the springs to effect the lubrication thereof.

In such use, as in many other situations involving the use of sprayers having delivery apertures of very small diameter, there frequently arises the familiar trouble of clogging of the nozzle aperture by some tiny particle of dirt or other foreign matter in the fluid. Such clogging almost invariably forces a suspension of the operation until the nozzle is cleared by shaking or blowing out the obstruction, or by the more common necessity of hunting up a fine wire or similar instrument to poke through the aperture in the nozzle. Since these obstructions customarily lodge in the delivery aperture because they are too large to pass through, the nozzle must almost invariably be taken apart or removed so that the obstruction can be cleared without being pushed back into the pipe line to clog the nozzle a second time, the whole operation being a fruitful source of annoyance and delay in many fields of use of sprayers.

To avoid this familiar nuisance, the invention affords a simple solution through providing a nozzle which is exactly symmetrical, in that identical or similar attaching means for fixing the nozzle to the delivery end of the conduit is provided at each end of the delivery passage, whereby when such passage becomes clogged with a particle of dirt, the operator merely has to unscrew or otherwise detach the nozzle and reverse it end for end and reapply it to the conduit, whereby upon resumption of the spraying the obstruction which has lodged at the prior ingress end of the delivery passage is forced out by the pressure of the fluid.

Thus the reversible nozzle clears itself of the obstruction when the nozzle is changed end for end and thus the direction of flow through it is reversed, the use and operation of the nozzle being identical whichever end is outward.

An illustrative embodiment of the invention is shown in the accompanying drawings, in which Fig. 1 is a side elevation of the improved nozzle mounted on the end of a conduit by means of an intervening adapter.

Fig. 2 is a view similar to Fig. 1, showing the nozzle and adapter in diametric section.

Fig. 3 is an end view of Fig. 1 looking from the delivery end of the nozzle.

Fig. 4 is an end view of the nozzle and adapter of Fig. 1 viewed from the opposite end from that of Fig. 3, with the conduit removed.

Fig. 5 is a side elevation of the nozzle alone.

The improved nozzle 1 in its simplest form as shown in the drawings comprises a cylindrical body 3 of uniform diameter which is bored axially from each end for less than half the length of the body to form two identical cylindrical recesses 5 which are internally threaded with identical threads. Axially disposed in the wall 7 which separates the two recesses is provided a cylindrical passage 9 of much less diameter which forms the actual discharge passage or orifice of the nozzle. This passage 9 is of uniform diameter throughout, and preferably has its extremities equidistant from the mid-point in the length of body 3.

In ordinary use, the nozzle is screwed onto the reduced and externally threaded male end portion 11 of an adapter 13 having a central passage 15 materially larger than the bore 9 of nozzle 1 and a polygonal sleeve portion 17 which is internally threaded to screw tightly and more or less permanently upon the threaded extremity 19 of the discharge conduit 21 of a spray gun or other similar device (not shown).

In practice, the exterior surface of nozzle 1 is commonly reeded, knurled, or made polygonal in section, to facilitate gripping the nozzle securely with the fingers in screwing it on and off from the end 11 of adapter 13.

Thus constituted, when any particle of dirt too large to pass through the passage 9 of the nozzle 1 reaches the inward end of such passage and lodges therein to clog the delivery aperture which this passage forms, the operator merely unscrews nozzle 1 with his fingers, turns it end for end and applies to the portion 11 the threaded recess 5 which previously was at the discharge side of passage 9, screwing the nozzle into place on the adapter with his fingers alone. The resumption of discharge of the fluid through passage 9 in what is now the reverse direction to that which brought the obstruction into clogging relation with the previously inward end of passage 9, expels the obstructing particle entirely from the nozzle and the spraying proceeds as before. Since the nozzle is exactly symmetrical in its construction, the action thereof in delivering the spray or jet is unchanged in any way by this reversal.

The successful operation and practical value of the improved nozzle results from the observed fact that under the high pressures used in these spray guns, particularly in automotive practice, any particle of dirt small enough to actually enter the passage 9 will necessarily be forced clear through, while particles able to clog the delivery aperture against these pressures are necessarily too large to pass through, and hence stand outside of and against the shoulder defining the ingress end of passage 9. For this reason, they are easily and instantaneously expelled by the reversal of flow through such passage which results from turning the nozzle end for end on its support, the adapter 13. The bore of the recess 5 beyond the delivery end of passage 9 is so much larger than passage 9 and the jet or column of spray extruded therefrom as to make it impossible for the particle of dirt to interfere with the jet or spray even though such particle might fail to be blown clear out of the remaining length of the nozzle. These recesses 5 are of such ample diameter and of such relatively short length as not to modify the shape or character of the emitted jet or spray from what it would be if the passage 9 were flush with the delivery end of nozzle 1.

While we have illustrated and described a certain form in which the invention may be embodied, we are aware that many modifications may be made therein by any person skilled in the art, without departing from the scope of the invention as expressed in the claim. Therefore, we do not wish to be limited to the particular form shown, or to the details of construction thereof, but what we do claim is:

The combination with a conduit supplying liquid under pressure, of an adapter screwed upon the discharge end thereof, and having an externally threaded end portion, and a nozzle screwed upon such end portion, having identical cylindrical recesses at each end internally threaded to fit upon such end portion, the recesses being connected by a passage of reduced diameter extending throughout a substantial portion of the length of the nozzle and of cylindrical shape, the nozzle being adapted to be removed and reversed and then replaced without changing the nature of the jet delivered in either position of attachment to the said end portion, whereby a dirt particle clogging such passage in the first position of its attachment may be expelled.

HYMAN GREENSPOON.
NORMAN KRISTAL.

REFERENCES CITED

The following references are of record in the file of this patent:

UNITED STATES PATENTS

| Number | Name | Date |
| --- | --- | --- |
| 1,827,583 | James | Oct. 13, 1931 |

FOREIGN PATENTS

| Number | Country | Date |
| --- | --- | --- |
| 1,219 | Great Britain | 1872 |